United States Patent [19]
Earp

[11] 3,754,261
[45] Aug. 21, 1973

[54] RADIO NAVIGATION BEACON

[75] Inventor: Charles W. Earp, London, England

[73] Assignee: International Standard Electric Corporation, New York, N.Y.

[22] Filed: Mar. 27, 1972

[21] Appl. No.: 238,403

[52] U.S. Cl............................................. 343/106 D
[51] Int. Cl............................................... G01s 1/38
[58] Field of Search................................. 343/106 D

[56] References Cited
UNITED STATES PATENTS
3,613,096   10/1971   Earp .................................... 343/113

*Primary Examiner*—Benjamin A. Borchelt
*Assistant Examiner*—Richard E. Berger
*Attorney*—C. Cornell Remsen, Jr., Thomas E. Kristofferson et al.

[57] ABSTRACT

A method and apparatus for improved signal amplitude tapering in a Doppler Navigation system having a multi-element linear array which is R.F. excited element-by-element through a commutator to produce a Doppler signal at a remote receiving point. A reference antenna is also provided to radiate a signal against which received DOppler signals can be interpreted at the remote point, in terms of angle with respect to a predetermined navigational path. The elements of the array are commutated in sub-scans with or without alternation of scan direction and a portion of the sub-scans omit a few elements at one or both extremities of the array for tapering purposes.

10 Claims, 10 Drawing Figures

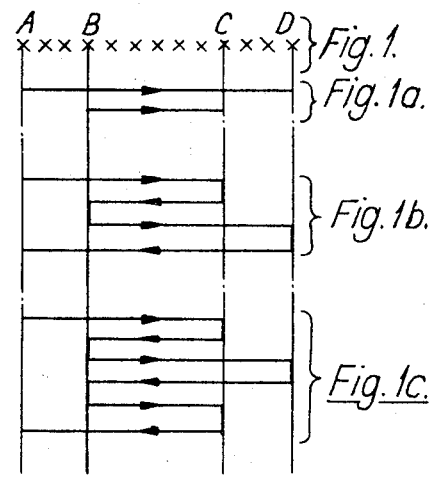
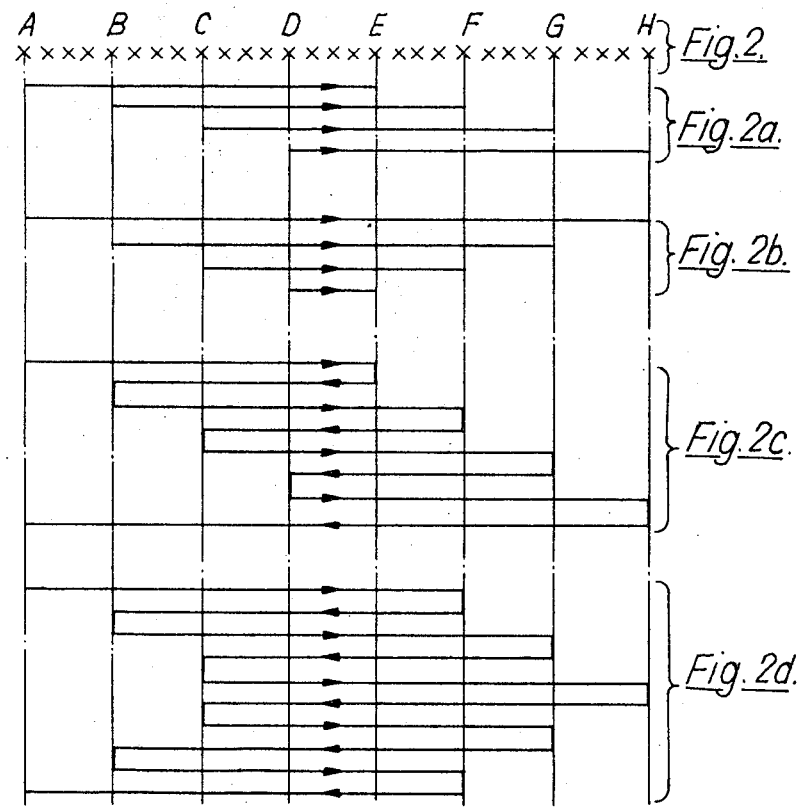

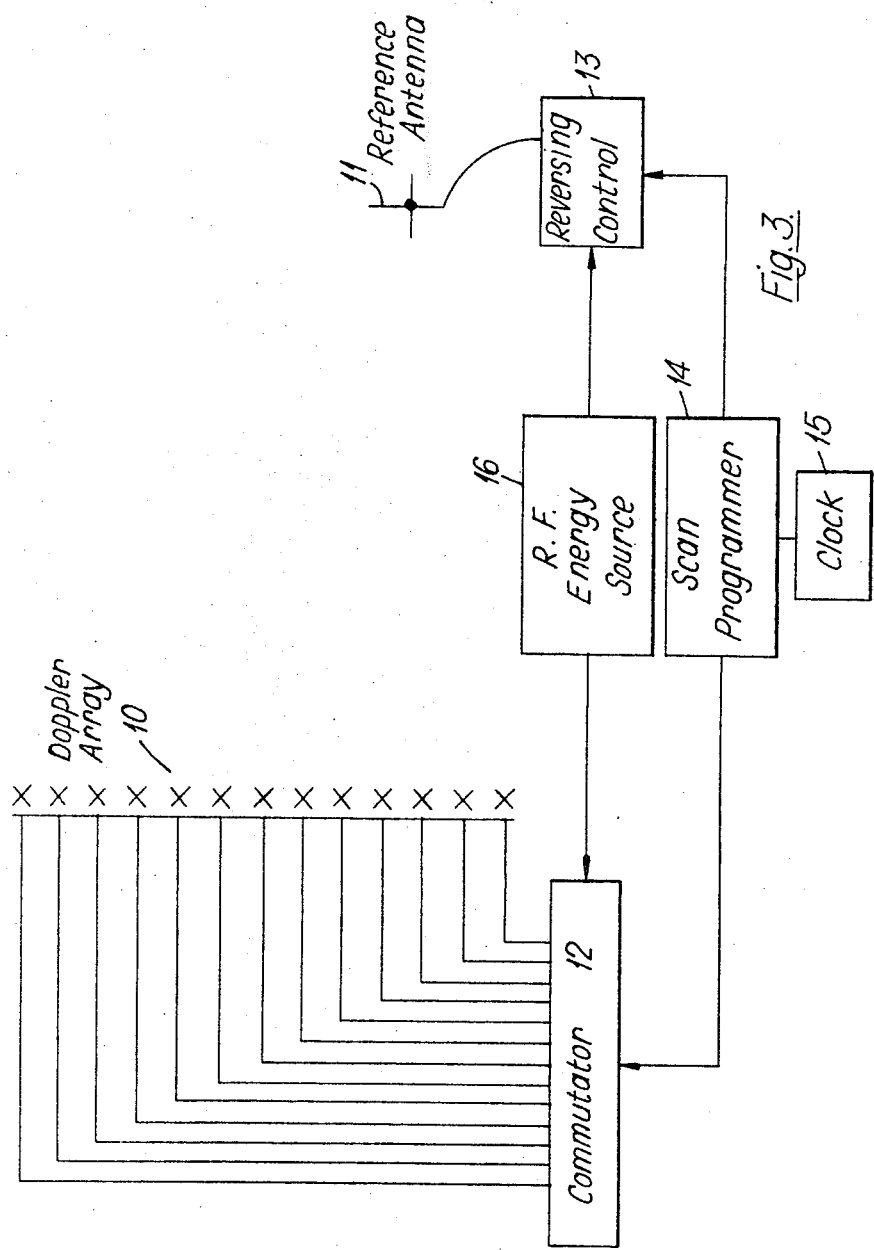

RADIO NAVIGATION BEACON

CROSS REFERENCE TO RELATED APPLICATION:

This application is filed under the provisions of 35 U.S.C. 119 with claim for the benefit of the filing of an application covering the same invention filed in Great Britain on Mar. 23, 1971, Ser. No. 07547/71.

BACKGROUND OF THE INVENTION

1. Field of the Invention

This invention relates to radio beacons for navigation or direction finding systems.

2. Description of the Prior Art

In the particular Doppler beacon described in U.S. Pat. application No. 859,915, filed Sept. 22, 1969, now U.S. Pat. No. 3,613,096, direction as measured from the antenna array of the beacon is defined by the frequency of the commutated wave emitted in that direction. A single scan of the antenna array being finite in time, the total spectrum emitted is theoretically infinite, but in each direction it is primarily comprised of a main 'frequency-lobe' and a system of frequency 'sidelobes.' When uniform amplitude excitation of individual radiators is used, the frequency sidelobes decay in amplitude approximately according to a (sin $x/x$) law, which for some purposes is not a sufficiently rapid decay.

U.S. Pat. application No. 869,527 filed Oct. 27, 1969, now Pat. No. 3,613,096 shows that amplitude tapering of antenna excitation can be employed as an expedient to exercise control over frequency sidelobes, just as amplitude tapering of the simultaneous excitations of the elements of a phased array is able to suppress the amplitude sidelobes of its polar radiation pattern. Amplitude tapering of the excitation of a Doppler array, as described in the aforementioned U.S. Pat. application No. 869,527 filed Oct. 27, 1969, is completely effective, particularly when the receiver uses the 'tracking-filter' type of frequency decoding technique. However, when it is desired to use the single frequency-counting type of receiver, as described in U.S. Pat. application No. 4,653 filed Jan. 21, 1970, a disadvantage arises when the transmitted wave is tapered, owing to the resultant loss of signal to noise ratio corresponding to times of maximum taper. A further disadvantage is that the radiated signal is correspondingly more susceptible to interference.

As also described in the aforementioned U.S. Pat. application No. 859,915 filed Sept. 22, 1969, tapering of the signal amplitude can be applied after reception of the signal, but this introduces a complexity which is preferably avoided.

SUMMARY

In accordance with the state of the prior art as hereinabove described, it may be said to be the general object of the present invention to obtain a form of effective tapering of transmission which maintains the full advantage of constant-amplitude transmission in suppressing the effects of noise and interference, while permitting the efficient use of the frequency-counting type of receiver.

According to the invention there is provided a radio navigation beacon including a linear array of equally spaced radiating elements, and means for connecting a source of constant amplitude radio frequency energy to each of said aerials in turn, so as to simulate constant velocity unidirectional or bidirectional motion of a single radiating element along the array, whereby each complete scanning cycle of the array comprises a complex scan program in which the antenna elements intermediate the end portions of the array are scanned more frequently than the end elements.

BRIEF DESCRIPTION OF THE DRAWINGS

Preferred embodiments of the invention will now be described with reference to the accompanying drawings, in which:

FIG. 1 illustrates an arbitrary 13-element linear array.

FIGS. 1a, 1b and 1c illustrate alternative complex scan programs of the array of FIG. 1.

FIG. 2 shows a 29-element linear array.

FIGS. 2a, 2b, 2c and 2d illustrate alternative complex scan programs for the array of FIG. 2.

FIG. 3 illustrates the general system elements required to instrument the present invention.

DESCRIPTION OF THE PREFERRED EMBODIMENTS

For the sake of illustration of the basic principle of the present invention, assume a very simple case, i.e., that the total array is comprised of 13 equally spaced elements as shown in FIG. 1.

The single scan (prior art form) from A to D of the systems of the above mentioned specifications is replaced by successive scans of A to D, then B to C, FIG. 1a. Linear velocity of scan is continuously maintained, so that centroids of spectra of the separate sub-scans coincide. However, the fact that the corresponding A D and B C spectra have different sidelobe spacing permits substantive mainlobe addition, and some reduction of sidelobe level.

In the above simple case, the scan is unidirectional, but, as described in U.S. Pat. application No. 4,653, filed Jan. 21, 1970, the total scan may be bi-directional. With bi-directional scanning, the 'complex' scan is A → C → B → D → A, as seen in FIG. 1b, or A → C → B → D → B → C → A as seen in FIG. 1c.

Here, it should be noted that on reversal of direction of scan, it is ncessary to reverse the sense of the frequency-offset of the reference wave as compared to the commutated wave.

It will be clear from a basic understanding of the situation, that the necessary degree of tapering for some purposes may not be achieved by the simple system of the figure, and in general, there will be more than the two intermediate points B and C in a practical arrangement from which sub-scans may start and finish. Thus, a total array of 29 equally spaced elements stretching from A to H, as given in FIG. 2, may have sub-scans terminating at intermediate antenna positions B, C, D, E, F and G.

One form of unidirectional complex scan program for that larger array is made up of sub-scans A → E, B → F, C → G, D → H, (FIG. 2a).

Alternatively, a unidirectional complex scan program may be made up of A → H, B → G, C → F, D → E, (FIG. 2b).

Examples of bidirectional complex scan programs for the array of FIG. 2 are A → E → B → F → C → G → D → H → A, (FIG. 2c), or A → F → B → G → C → H → C → G → B → F → A, (FIG. 2d).

It is to be understood that exact design of a complex scanning program or cycle will embody considerations of 'granularity' of count in the receiver Thus, whereas in the known system of U.S. Pat. application No. 4,653, filed Jan 21, 1970, relative phase of reference and scanning radiations is modified for each successive scan, it is possible and may be desirable to re-phase successive sub-scans in a system according to the present invention.

Referring now to FIG. 3, a functional block diagram illustrating the general type of instrumentation appropriate for the present invention, is shown.

The Doppler array 10 may extend in either the horizontal or vertical plane, depending upon whether the predetermined ideal navigation path with which the equipment concerns an elevation glide slope or an azimuth (bearing) angle determination.

A Doppler array 10 is shown in the 13 element form, although it of course be understood that many more elements might be involved in a practical case as hereinbefore indicated.

Since the array elements are energized one at a time, from the substantially continuous radio frequency source (transmitter) 16, the form of commutator 12 must be appropriate for handling radio frequencies. Such commutators are known per se, and may be electro-mechanical or wholly electronic devices. It will be realized that the basic functions of the clock 15 and scan programmer 14 would be incorporated within the commutator device, if it were a self synchronous electronic device, for example.

It is the functional purpose of the scan programmer 14 to impose the type of switch program selected from FIGS. 1 or 2. Taking FIG. 1c as an aribitrary example, it will be seen that there are six scan lines, each referred to as a sub-scan. These six sub-scans taken together form a cycle of the repetitive program. The clock 15 will be understood to provide a basic timing control for an electronic switch array in 14, to control elements such as, for example, solid state radio frequency switching elements in the commutator 12.

As understood in the various prior art references given hereinabove, a reference antenna 11 is used in the system to provide a relatively continuous radio frequency reference separated (for example) in frequency from the operating R.F. frequency of the Doppler array 10.

A remote receiving station normally on an approach aircraft, receives both the Doppler array and reference antenna radiations. For the details of angle determination at the receiving station, the reader is referred to the indicated prior art and related cases. The reversing control 13 is operated from the scan controller 14, so that whenever the commutator 12 is called upon to change direction of scan for any one sub-scan, the phase of the reference radiation is reversed. This also, is further explained in the aforementioned related cases.

The foregoing description of specific examples of this invention is presented by way of illustration only, and is not to be construed as constituting a limitation on the scope of the invention.

What is claimed is:

1. In a Doppler Navigation Beacon system having at least one linear antenna array, having a plurality of substantially equally spaced elements disposed along a line at an angle with respect to a predetermined navigational path, the combination comprising:

a source of radio frequency energy;

commutating means adapted for energizing the elements of said array substantially one at a time in a program comprising a plurality of sub-scans;

and scan programming means for controlling said commutating means to energize said elements in a predetermined repetitive program of said sub-scans in which at least a portion of said elements adjacent to at least one end of said array are omitted from said energizing during at least one sub-scan in each of said programs.

2. Apparatus according to claim 1 in which a first portion of said sub-scans are accomplished in a first direction along said array and a second portion of said sub-scans are accomplished in a second direction along said array.

3. Apparatus according to claim 2 in which said sub-scans alternate between said first and second directions.

4. Apparatus according to claim 1 including a reference antenna for radiating in a substantially constant signal whereby a receiving station may evaluate its angle with respect to said predetermined navigational path as a function of the received Doppler signal characteristics radiated at said angle by said array as compared to a characteristic of the radiation of said reference antenna, said angle of said array with respect to said navigational path being substantially a right angle.

5. Apparatus according to claim 4 in which said commutating means energizes said elements successively, switching from each element to the next in substantially the same amount of time, thereby to simulate a moving source having constant velocity.

6. Apparatus according to claim 1 in which a first portion of said sub-scans are programmed to produce commutation over all of the elements of said array and a second portion of said sub-scans are programmed to produce commutation over all except an equal number of elements at each extremity of said array.

7. Apparatus according to claim 1 in which a first portion of said sub-scans are programmed to produce commutation over all of the elements of said array and a second portion of said sub-scans are programmed to produce commutation over all except a predetermined number of elements at one extremity or the other of said array.

8. Apparatus according to claim 2 in which said first portion of said sub-scans includes sub-scans programmed to energize all elements of said array except a first predetermined number of elements at a first extremity of said array, and said second portion of said sub-scans includes sub-scans programmed to energize all elements of said array except a second predetermined number of elements at a second extremity of said array.

9. Apparatus according to claim 8 in which said first predetermined number of elements at said first extremity of said array and said second predetermined number of elements at said second extremity of said array differ from sub-scan to sub-scan.

10 Apparatus according to claim 9 in which the number of elements omitted from sub-scans at said first extremity of said array equals those omitted from sub-scans at said second extremity of said array over any number of said predetermined repetitive programs.

* * * * *